United States Patent [19]

Peters et al.

[11] Patent Number: 4,689,391
[45] Date of Patent: Aug. 25, 1987

[54] PROCESS FOR MAKING POLYETHERIMIDES

[75] Inventors: Edward N. Peters, Lenox; Daniel W. Fox, Pittsfield, both of Mass.

[73] Assignee: General Electric Company, Pittsfield, Mass.

[21] Appl. No.: 684,960

[22] Filed: Dec. 21, 1984

[51] Int. Cl.$^4$ ............................................. C08G 73/10
[52] U.S. Cl. ..................................... 528/179; 528/26; 528/28; 528/125; 528/126; 528/173; 528/183; 528/185; 528/188; 528/351; 528/352; 528/353
[58] Field of Search ................... 528/26, 28, 125, 126, 528/128, 173, 179, 183, 185, 188, 351-353

[56] References Cited

U.S. PATENT DOCUMENTS

| | | | |
|---|---|---|---|
| 3,847,867 | 11/1974 | Heath et al. | 524/600 |
| 4,421,907 | 12/1983 | Schmidt et al. | 528/185 |
| 4,443,592 | 4/1984 | Schmidt et al. | 528/185 |

Primary Examiner—Lucille M. Phynes
Attorney, Agent, or Firm—Bernard, Rothwell & Brown

[57] ABSTRACT

A process for making polyetherimides involving reacting an aromatic bis(ether anhydride) with an organic diamine in the presence of a solvent so as to form a polyamide acid. The polyamide acid is thereafter polymerized in a solid state at a temperature below the glass transition temperature of the final polyetherimide.

14 Claims, No Drawings

PROCESS FOR MAKING POLYETHERIMIDES

BACKGROUND OF THE INVENTION

Polyetherimides are unique polymers which exhibit superior physical and chemical properties, including high heat resistance, exceptional strength, and excellent processability. These polymers can be used as wire coatings and are particularly suited for injection molding applications.

A number of processes for making polyetherimides have been disclosed. Generally, these polymers are prepared by reacting an organic diamine with a aromatic bis(ether dicarbonyl), i.e., an aromatic bis(ether anhydride) or an aromatic bis(ether dicarboxylic acid). Two processes which have been of particular interest are the so-called melt polymerization and solution polymerization processes. The basic melt polymerization process was described by T. Takekoshi and J. Kochanowski, U.S. Pat. No. 3,803,805. This process involves combining an aromatic bis(ether anhydride) and an organic diamine and heating the mixture under an inert atmosphere to form a homogeneous melt. Water formed during the polymerization reaction is removed at a temperature of up to 350° C. In a preferred embodiment of the process, the final stage of the reaction is conducted under reduced pressure to facilitate removal of water. The basic polyetherimide polymerization technique has been improved by employing catalysts to enhance yields or reaction rates (for example, see Takekoshi, et al. U.S. Pat. No. 3,833,544 and F. Williams III, et al., U.S. Pat. No. 3,998,840, and Takekoshi, U.S. Pat. No. 4,324,882). In addition, the melt polymerization method has been adapted to the continuous mode by conducting the reaction in extrusion apparatus (For example, see Takekoshi, et al U.S. Pat. No. 4,011,198 and Banucci, et al. U.S. Pat. No. 4,073,773.)

Solution polymerization is generally conducted reacting an aromatic bis(ether anhydride)and an organic diamine in an inert solvent at temperatures up to about 200° C. With this procedure, water of reaction is typically removed by azeotropic distillation. The resulting polymer is generally recovered by mixing the reaction solution with a precipitant, such as methanol. The reaction solvents employed for solution polymerization reactions are selected for their solvent properties and their compatibility with the reactants and products. High-boiling nonpolar organic solvents are preferred. (E.g., see Takekoshi, et al., U.S. Pat. No. 3,991,004.) Dipolar, aprotic solvents and phenolic solvents can also be used, particularly when an aromatic bis(ether dicarboxylic acid) is used as the starting material (e.g., see Takekoshi, et al., U.S. Pat. No. 3,905,942).

Although the foregoing procedures have been used effectively to produce polyetherimides of high quality, they do suffer from certain disadvantages. The principal problems associated with the melt polymerization technique involve controlling the stoichiometric ratio of the reactants during the course of the reaction. Economical production of a polymer having the desired physical and chemical characteristics usually requires controlling the relative proportions of anhydride, diamine and any chain termination agent that is employed. Because of the relatively high temperatures employed in the melt polymerization process and the disparate volatalities of these components, controlling the stoichiometry of the mixture has proven difficult. A further disadvantage of conventional melt polymerization techniques is that the reaction mixtures pass through a so-called "cement stage" as polyamide acid intermediate is formed. During this phase of the reaction, the reaction mixtures become very viscous and difficult to process. D. Heath and J. Wirth (U.S. Pat. No. 3,847,867) disclose a method for preparing polyetherimides which involves stirring a solution of an aromatic bis(ether anhydride) and an organic diamine in a dipolar, aprotic solvent under ambient conditions to produce a polyamide acid and casting the polyamide acid solution on a substrate to facilite the removal of the organic solvent. The cast polyamide acid film can then be heated at temperatures of 150° C. or higher. After the initial heating, the cast film can then be heated to temperatures of from 200° C.–300° C. to convert the polyamide acid to the polyetherimide. While this solution process has some advantages over the melt polymerization due to the complexity and cost of melt polymerization, the subsequent treatment at temperatures up to 300° C. is undesirable. Polyetherimides generally have glass transition temperatures ranging from about 170° to 240° C. If one heats a polyamide acid in excess of the glass transition temperature of the final product, the polyamide particles stick together, become partially molten and thus do not provide a uniform imidization of the polyamide acid.

Accordingly, there is a continuing need for an efficient process for producing high quality polyetherimides.

SUMMARY OF THE INVENTION

In accordance with the present invention, there is disclosed a process for making polyetherimides which comprises:

(a) reacting an aromatic bis(ether anhydride) with an organic diamine in a solvent under polyamide acid forming conditions;

(b) isolating the polyamide acid and substantially removing the solvent; and (c) heating the polyamide acid in the solid state to a temperature below the glass transition temperature of the final polyetherimide product to form the polyetherimide.

DETAILED DESCRIPTION OF THE INVENTION

The first step of the process of the present invention involves reacting an aromatic bis(ether anhydride) of the formula

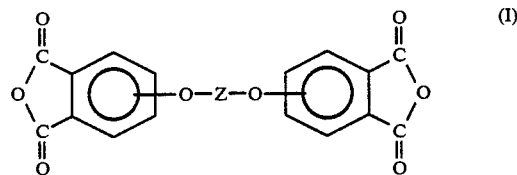

with at least one organic diamine having the formula

in solution under polyamide acid-forming conditions, wherein Z is a member selected from the group consisting of (A) divalent organic radicals of the formula:

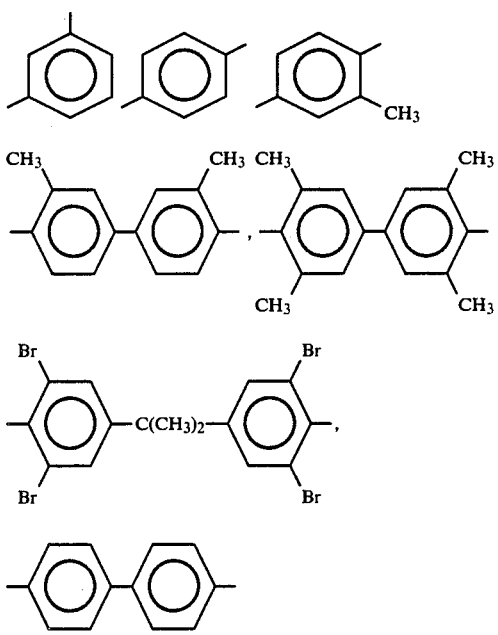

and (B) divalent organic radicals of the general formula

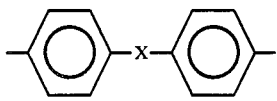

where X is a member selected from the group consisting of divalent radicals of the formulas

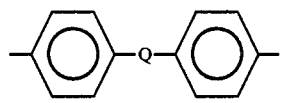

where y is an integer from 1 to about 5; and R is a divalent organic radical selected from the group consisting of (a) aromatic hydrocarbon radicals having from 6 to about 20 carbon atoms and halogenated derivatives thereof (b) alkylene radicals having from 2 to about 20 carbon atoms, (c) from $C_2$ to about $C_8$ alkylene terminated polydiorganosiloxnae, and (d) divalent radicals of the general formula

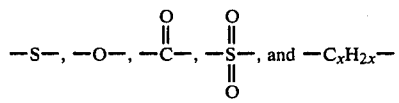

where Q is a member selected from the group consisting of:

$$-S-, -O-, -\overset{\overset{O}{\|}}{C}-, -\overset{\overset{O}{\|}}{\underset{\underset{O}{\|}}{S}}-, \text{ and } -C_xH_{2x}-$$

and x is an integer from 1 to about 5.

Bis(ether anhydride)s of formula I include for example, 1,3-bis(2,3-dicarboxyphenoxy)benzene dianhydride;
1,4-bis(2,3-dicarboxyphenoxy)benzene dianhydride;
1,3-bis(3,4-dicarboxyphenoxy)benzene dianhydride; and
1,4-bis(3,4-dicarboxyphenoxy)benzene dianhydride.

A preferred class of aromatic bis(ether anhydride)s included by formula I includes compounds of formulas III, IV and V, which follow:

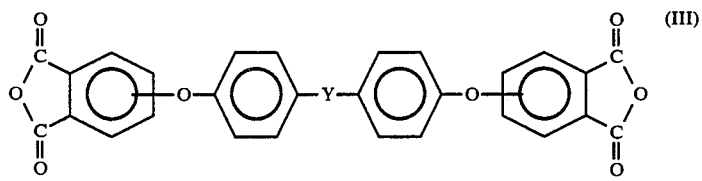
(III)

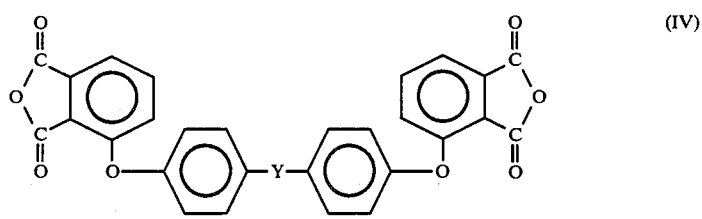
(IV)

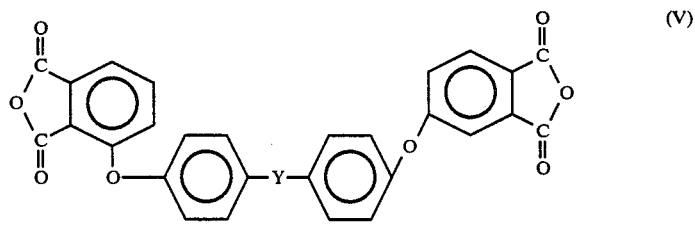
(V)

and mixtures thereof, where Y is selected from the group consisting of —O—, —S—,

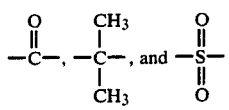

Aromatic bis(ether anhydride)s of formula III include, for example:
2,2-bis[4-(3,4-dicarboxyphenoxy)phenyl]propane dianhydride,
4,4'-bis(3,4-dicarboxyphenoxy)diphenyl ether dianhydride;
4,4'-bis(3,4-dicarboxyphenoxy)diphenyl sulfide dianhydride;
4,4'-bis(3,4-dicarboxyphenyoxy)benzophenone dianhydride;
4,4'-bis(3,4-dicarboxyphenoxy)diphenyl sulfone dianhydride; and mixtures thereof.

Aromatic bis(ether anhydride)s of formula IV include, for example:
2,2-bis[4-(2,3-dicarboxyphenoxy)phenyl]propane dianhydride;
4,4'-bis(2,3-dicarboxyphenoxy diphenyl ether dianhydride;
4,4'-bis(2,3-dicarboxyphenoxy)diphenyl sulfide dianhydride;
4,4'-bis(2,3-dicarboxyphenoxy)benzophenone dianhydride;
4,4'-bis(2,3-dicarboxyphenoxy)diphenyl sulfone dianhydride; and mixtures thereof.

The aromatic bis(ether anhydride) of formula V may be, for example,
4-(2,3-dicarboxyphenoxy)-4'-(3,4-dicarboxyphenoxy) diphenyl-2,2-propane dianhydride.

Some of the aromatic bis(ether anhydride)s of formula (I) are shown in U.S. Pat. No. 3,972,902 (Darrell Heath and Joseph Wirth). As described therein, the bis(ether anhydride)s can be prepared by the hydrolysis, followed by dehydration, of the reaction product of a nitrosubstituted phenyl dinitrile with a metal salt of a dihydric phenol compound in the presence of a dipolar, aprotic solvent.

Additional aromatic bis(ether anhydride)s also included by Formula (I) are shown by Koton, M. M., Florinski, F. S. Bessonov, M. I., Rudakov, A. P. (Institute of Heteroorganic Compounds, Academy of Sciences, U.S.S.R.), U.S.S.R. 257,010, Nov. 11, 1969, Appl. May 3, 1967, and by M. M. Koton, F. S. Florinski, Zh. Org. Khin, 4(5), 774 (1968).

Other dianhydrides may also be used in combination with the dianhydrides of Formula I to form copolymers. Examples of such dianhydrides include pyromellitic dianhydride, sulfur dianhydride, benzophenone dianhydride and the like.

The organic diamines of Formula (II) include, for example:
m-phenylenediamine,
p-phenylenediamine,
-4'-diaminodiphenylpropane,
-4'-diaminodiphenylmethane (commonly named 4,4'-methylenedianiline).
4,4'-diaminodiphenyl sulfide,
4,4'-diaminodiphenyl sulfone,
4,4'-diaminodiphenyl ether (commonly named 4,4'-oxydianiline),
1,5-diaminonaphthalene,
3,3'-dimethylbenzidine,
3,3'-dimethoxybenzidine;
2,4-bis(β-amino-t-butyl)toluene,
bis(p-β-amino-t-butylphenyl)ether,
bis(p-β-methyl-o-aminopentyl)benzene,
1,3-diamino-4-isopropylbenzene,
1,2-bis(3-aminopropoxy)ethane, benzidine,
m-xylylenediamine,
p-xylylenediamine,
2,4-diaminotoluene
2,6-diaminotoluene,
bis(4-aminocyclohexyl)methane; 3-methyheptamethylenediamine,
4,4-dimethylheptamethylenediamine;
2,11-dodecanediamine,
2,2-dimethylpropylenediamine, octamethylenediamine,
3-methoxyhexamethylenediamine;
2,5-dimethylhexamethylenediamine,
2,5-dimethylheptamethylenediamine,
3-methylheptamethylenediamine,
5-methylnonamethylenediamine,
1,4-cyclohexanediamine,
1,12-octadecanediamine,
bis(3-aminopropyl)sulfide
N-methyl-bis(3-aminopropyl)amine,
hexamethylenediamine,
heptamethylenediamine,
nonamethylenediamine,
decamethylenediamine,
bis(3-aminopropyl)tetramethyldisiloxane,
bis(4-aminobutyl)tetramethyldisiloxane, and mixtures of such diamines.

The aromatic bis(ether anhydride) and the organic diamine can be reacted in the presence of a solvent under ambient conditions to produce the polyamide acid. Generally, the reaction temperatures are from about 0° C. to about 200° C. with temperatures of from 15 to about 30 being preferred. In general, any reaction solvent can be used in which the reactants are sufficiently soluble and which does not react significantly with the reactants or products under the conditions employed. Solvents that can be used include aliphatic and aromatic hydrocarbons, esters, ethers, ketones, and the like. Water or mixtures of water and water-miscible solvents can also be employed. If the boiling point of the solvent (at atmospheric pressure) is lower than the reaction temperature, pressure vessels may be employed to achieve the desired temperatures. Examples of solvents that can be used include dichloromethane, chloroform, benzene, toluene, xylene, n-octane, n-decane, acetone, methylethylketone, ethyl acetate, water and mixtures thereof. Preferred solvents are dichloromethane, acetone and water.

In one embodiment of the present invention, the polyamide acid is formed in a solvent in which the polyamide acid is insoluble and precipitates from the solution. Such a solvent allows easy recovery of the polyamide acid and separation from the solvent-polyamide acid mixture. One example of such a solvent is dichloromethane, a preferred solvent. In the alternative, a solvent can be used in which the polyamide acid is soluble, in which case the polyamide acid can be easily precipitated by adding another suitable solvent in which the polyamide acid is not soluble.

Any order of addition of reactants may be used. It is preferred to effect the reaction of the dianhydride and the organic diamine in an inert atmosphere, such as nitrogen or helium. Sufficient solvent is generally utilized to provide a solids content in the range between 1% and 90%, preferably in the range between about 15% and about 50%.

The reactants are advantageously employed in ratios of from about 0.5 to about 2.0 mole of organic diamine per mole of aromatic bis(ether anhydride), preferably from about 0.9 to about 1.1 mole of organic diamine per mole of aromatic bis(either anhydride). It is most preferred that substantially equimolar amounts of the organic diamine and the aromatic bis(ether anhydride) are used. From 0.1 to 50 mole percent of comonomers based on the total moles of reactants can be employed to form copolymers.

Reaction time for the first process step can vary from about 0.2 to about 20 hours, depending upon such factors as the temperature employed, degree of agitation, nature of reactants, solvent, and the like. Various catalysts can be employed in catalytic amounts. Such catalysts include inorganic salts, such as alkali metal carbonates, sodium chlorate or ferric sulfate, and oxygenated phosphorous compounds of various alkali metals, such as sodium phenyl phosphonate.

The first process step produces a polyamide acid-solvent mixture. As used herein, the term polyamide acid means a material which generally contains a substantial proportion of polyamide acid groups and few, if any, polyetherimide groups.

The polyamide acid which is formed in the initial reaction is recovered from the polyamide acid-solvent mixture and any excess solvent is removed. This recovery can be achieved by various methods known to those skilled in the art, such as filtration, especially if the solvent used is one in which the polyamide acid is insoluble. In another embodiment, the polyamide acid-solvent mixture is formed into a thin film under solvent-volatizing conditions to effect substantially complete solvent and water removal. This step can advantageously be conducted in a continuous manner using conventional thin-film evaporation equipment. Such equipment can take a variety of forms, and the process of the present invention is not limited to any particular form of equipment.

After the polyamide acid has been recovered and the excess solvent removed, the polyamide acid is normally in a powder state as a result of being precipitated out of solution or in the alternative, if the polyamide acid is in the form of a sheet, the polyamide acid is chopped, pelletized, etc. Preferably, the polyamide acid is thereafter dried prior to solid state polymerization. The polyamide acid can be dried in a variety of conventional methods including passing hot air through the powder for a time sufficient to substantially dry the polyamide acid.

As a final process step, the polyamide acid is heated in a solid state to complete the polymerization of the polyamide acid. While the temperature and reaction time of the solid state polymerization can vary, reaction temperatures are maintained below the glass transition temperature of the final polyetherimide product. The polyamide acid is preferably heated to a temperature of from about 170° to 200° C. for a time sufficient to complete polymerization. In one embodiment, the polyamide acid is charged into a fluidized bed reactor where the polyamide acid is contacted with a heated inert gas in a countercurrent flow so as to "fluidize" the polyamide acid particles. In another embodiment, a static bed reactor can be used wherein, the polyamide acid is charged into the reactor, which is thereafter heated in a conventional manner or an inert gas is directly passed through the reactor.

An inert gas serves to not only provide a means of heating the reactor and polyamide acid to the desired temperature but also removes any undesirable reaction products from the solid state polymerization reactor. Nitrogen is especially suitable for this purpose, particularly because it contributes to the overall economy of the process because of its low price. Preferably, the inert gas is recycled for economic reasons.

The solid state polymerization reaction can be monitored by measuring the intrinsic viscosity of the polymer that is produced. Generally, higher intrinsic viscosities indicate greater degrees of polymerization and higher molecular weights. The solid state polymerization is conducted until the product polymer has an intrinsic of at least about 0.05 dl/g preferably at least about 0.15 dl/g.

During the course of the solid state polymerization, water is produced as a result of the imidization reaction. The amount of water generated, as a percentage of theoretical, can also be used to monitor the course of the reaction. As previously discussed, the water as well as other byproducts can be removed on a continuous basis by use of a stream of inert gas.

Practice of the present invention is further illustrated by the following examples and should not be viewed as limiting the scope of the present invention.

EXAMPLE 1

Into a 1 liter three-necked flask equipped with a mechanical stirrer were charged 26.02 grams (0.05 moles) of 2,2-bis[4-(3,4-dicarboxyphenoxy)phenyl]propane dianhydride (hereinafter referred to a BPADA) and 500 ml. of dichloromethane. The mixture was stirred until the BPADA was dissolved. To this mixture was charged 5.41 g (0.05 moles) of m-phenylenediamine (hereinafter referred to as m-PDA) dissolved in 100 ml of dichloromethane. The reaction mixture was stirred for approximately 16 minutes. The mixture was then filtered, washed with dichloromethane and dried. The polyamide acid product had an intrinsic viscosity of 0.08 dl/g (measured in a 60:40 phenol:tetrachloroethane solution) and an acid number of 2.19 meq/g.

A series of solid state polymerizations was conducted with samples of the polyamide acid. The samples of the polyamide acid were placed in a 100 ml round bottom flask and heated while rotating (i.e., rotoevaporator in a oil bath) under a vacuum of 11 mm Hg. Samples of the polymer were taken and tested for intrinsic viscosity and acid number. Table 1 below lists the data corresponding to the time and temperature of the solid state polymerizations.

TABLE I

| | Solid State Polymerization | | |
|---|---|---|---|
| Temp (°C.) | Time (Hrs) | I.V. (dl/g) | Acid No. (meq/g) |
| — | 0 | 0.08 | 2.19 |
| 180 | 0.25 | 0.11 | 0.64 |
| 180 | 0.5 | 0.13 | 0.84 |
| 190 | 1.0 | 0.16 | 0.21 |
| 180 | 1.0 | 0.14 | 0.30 |
| 170 | 18.0 | 0.17 | 0.28 |
| 190 | 18.0 | 0.19 | 0.14 |

The resulting polymer had a glass transition temperature of 210° C.

EXAMPLE 2

Example 1 was repeated with the exception that acetone was substituted for the dichloromethane. The polyamide acid had an intrinsic viscosity of 0.08 dl/g and an acid number of 1.82 meq/g. The polyamide acid was then solid state polymerized as in Example 1. Table 2 below lists the intrinsic viscosity and acid number of the polymer as wel as the time and temperature of the solid state polymerizations.

TABLE 2

| Temp (°C.) | Solid State Polymerization | | |
|---|---|---|---|
| | Time (Hrs.) | I.V. (dl/g) | Acid No. (meq/g) |
| — | 0 | 0.08 | 1.82 |
| 180 | 0.25 | 0.20 | 0.58 |
| 180 | 1.0 | 0.21 | 0.56 |
| 180 | 18.0 | 0.38 | 1.06 |
| 180 | 24.0 | 0.34 | 0.12 |

The resulting polymer had a glass transition temperature of 214° C.

EXAMPLE 3

Into a 1 liter three-necked flask equipped with a mechanical stirrer were charged 52.05 g (0.10 moles) of BPADA, 113 g of acetone and 17 g of water. The mixture was stirred until the BPADA was dissolved. Into this mixture were then charged 10.81 g (0.10) of m-PDA. The mixture was stirred and a solution of 174 g of acetone and 26 g of water was added. The polyamide acid precipitated in the water layer and was recovered and dried. The polyamide acid had an intrinsic viscosity of 0.08 and an acid number of 4.71.

Samples of the polyamide acid were then solid state polymerized as in Example 1.

Table 3 below lists the data from the solid state polymerization.

TABLE 3

| Temp (°C.) | Solid State Polymerization | | |
|---|---|---|---|
| | Time (Hrs.) | I.V. (dl/g) | Acid No. (meq/g) |
| — | 0 | 0.08 | 4.71 |
| 170 | 0.25 | 0.08 | 1.88 |
| 170 | 0.5 | 0.08 | 1.52 |
| 180 | 0.5 | 0.10 | 1.06 |
| 190 | 0.5 | 0.14 | 0.65 |
| 180 | 1.0 | 0.10 | 1.08 |
| 180 | 3.0 | 0.13 | 0.70 |
| 190 | 18.0 | 0.16 | — |

EXAMPLE 4

Into a 1 liter three-necked flask equipped with a mechanical stirrer were charged 18.22 g (0.035 moles) of BPADA, 3.27 g (.015 moles) of pyromellitic dianhydride and 500 ml of dichloromethane. The mixture was stirred until the dianhydrides were dissolved. Into this mixture were charged 5.41 g (0.05 moles) of m-PDA dissolved in 100 ml of dichloromethane. The reaction mixture was then stirred for approximately 16 minutes. The mixture was filtered to isolate the polyamide acid. The polyamide acid was washed with dichloromethane and dried. The polyamide acid had an acid number of 2.54 and an intrinsic viscosity of 0.08 dl/g.

The polyamide was placed in a 100 ml round bottom flask and heated to 190° C. with a pressure of 15 mm of Hg. At periodic intervals, samples of the polymer were tested for intrinsic viscosity and acid number. Table 4 below lists the results.

TABLE 4

| Time (Hrs) | Acid Number (meq/g) | I.V. (dl/g) |
|---|---|---|
| 0 | 2.54 | 0.08 |
| 0.25 | 0.75 | 0.09 |
| 1.0 | 0.23 | 0.12 |
| 18.0 | 0.21 | 0.43 |

The resulting polymer had a glass transition temperature of 220° C.

EXAMPLE 5

Into a 1 liter three-necked flask equipped with a mechanical stirrer were charged 36.43 g (0.07 moles) of BPADA, 9.66 g (0.03 moles) of benzophenone dianhydride and 700 ml of dichloromethane. The mixture was stirred until the dianhydrides were dissolved. Into this mixture were charged 19.83 g (0.10 moles) of methylene dianiline dissolved in 200 ml of dichloromethane. The reaction mixture was stirred and the polyamide acid was filtered and dried as in the previous examples. The polyamide acid had an acid number of 3.02 and an intrinsic viscosity of 0.09 dl/g.

The polyamide acid was placed in a 100 ml round bottom flask and heated to 185° C. with a pressure of 12 mm Hg. At periodic intervals the polymer was tested for intrinsic viscosity and acid number. Table 5 below lists the results.

TABLE 5

| Time (Hrs) | Acid No. (meq/g) | I.V. (dl/g) |
|---|---|---|
| 0 | 3.02 | 0.09 |
| 0.5 | 0.52 | 0.09 |
| 2.0 | 0.19 | 0.15 |
| 18.0 | 0.20 | 0.44 |

The resulting polymer had a glass transition temperature of 221° C.

The data shows that the process of the present invention provides an efficient process for the production of polyetherimides.

It is understood that the foregoing detailed description is given merely by way of illustration and that many modifications may be made therein without departing from the spirit or scope of the present invention.

We claim:

1. A process of forming a polyetherimide which comprises:
   (a) reacting an aromatic bis(ether anhydride) of the formula

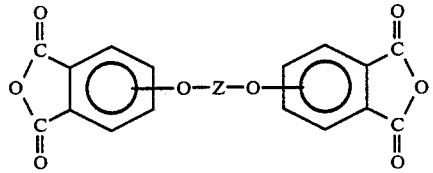

with an organic diamine of the formula

in the presence of a solvent under polyamide acid-producing conditions to form a polyamide acid;
   (b) isolating the polyamide acid from the solvent; and, (c) heating the polyamide acid in the solid state to a temperature below the glass transition temperature of the final polyetherimide product to form the polyetherimide; wherein Z is a member selected from the class consisting of (A) divalent organic radicals having the following formulas

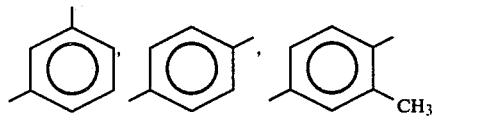

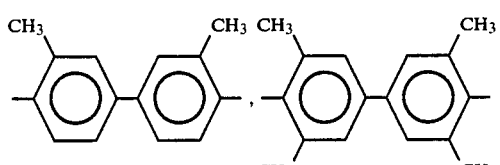

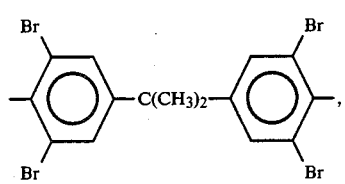

and (B) divalent organic radicals of the general formula

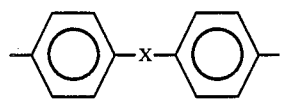

wherein X is a member selected from the group consisting of divalent radicals of the formulas

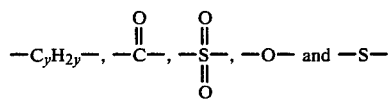

where y is an integer from 1 to about 5; and R is a divalent organic radical selected from the group consisting or aromatic hydrocarbon radicals having from 6 to about 20 carbon atoms and halogenated derivatives thereof, alkylene radicals having from 2 to about 20 carbon atoms, cycloalkylene radicals having from 3 to about 20 carbon atoms, from $C_2$ to about $C_8$ alkylene terminated polydioganosiloxane, and divalent radicals of the general formula

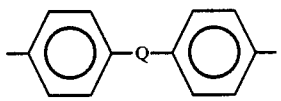

where Q is a member selected from the class consisting of

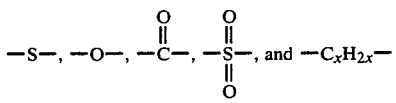

and x is an integer from 1 to about 5.

2. The process of claim 1, wherein the aromatic bis (ether anhydride) is of the formula

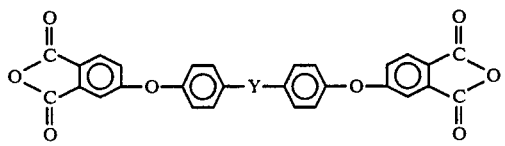

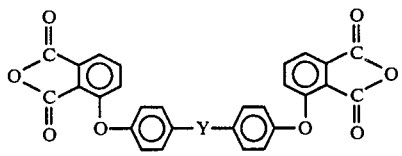

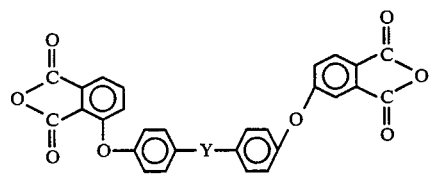

and mixtures thereof, where Y is selected from the group consisting of —O—, —S—,

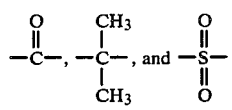

3. The process of claim 2, wherein the aromatic bis (ether anhydride) is of the formula

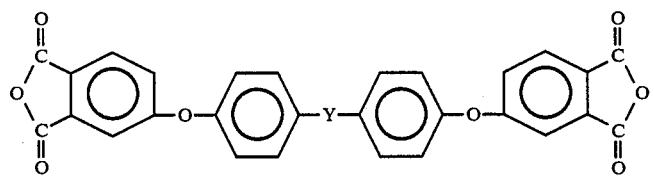

and Y is defined above.

4. The process of claim 2, wherein the aromatic bis (ether anhydride) is of the formula

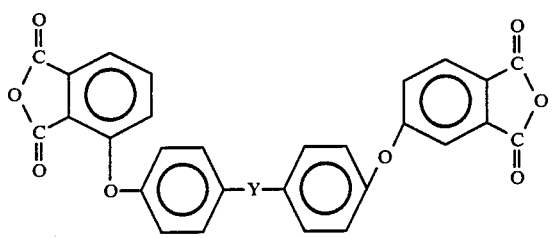

and Y is as defined above.

5. The process of claim 1, wherein the aromatic bis (ether anhydride) is 2,2-bis[4-(3,4-dicarboxyphenoxy)-phenyl] propane dianhydride and the organic diamine is m-phenylenediamine.

6. The process of claim 1, wherein said heating of the polyamide acid in the solid state is conducted in a fluidized bed reactor.

7. The process of claim 1, wherein said heating of the polyamide acid in the solid state is conducted in a static bed reactor.

8. The process of claim 1, wherein said solvent is selected from the group consisting of dichloromethane, chloroform, benzene, toluene, xylene, n-octane, n-decane, acetane, methylethylketone, ethyl acetate, water or mixtures thereof.

9. The process of claim 8, wherein said solvent is dichloromethane.

10. The process of claim 8, wherein said solvent is water.

11. The process of claim 1, wherein said polyamide acid is isolated by filtration.

12. The process of claim 1 wherein said polamide acid is heated until the final polyetherimide has an intrinsic viscosity of at least 0.05 dl/g.

13. The process of claim 12, wherein said polyetherimide has an intrinsic viscosity of at least 0.15 dl/g.

14. The process of claim 1, wherein in addition to the aromatic bis(ether anhydride) there is reacted a dianhydride selected from the group consisting of benzophenone dianhydride, sulfur dianhydride and pyromellitic dianhydride.

* * * * *